(12) United States Patent
Rushforth et al.

(10) Patent No.: US 11,953,641 B2
(45) Date of Patent: Apr. 9, 2024

(54) SECURE RECONSTRUCTION OF GEOSPATIAL DATA

(71) Applicant: LANDMARK GRAPHICS CORPORATION, Houston, TX (US)

(72) Inventors: Alexander James Rushforth, Houston, TX (US); Nilesh Ambadas Vyavahare, Oxford (GB); Jean-Christophe Wrobel-Daveau, Wantage (GB)

(73) Assignee: Landmark Graphics Corporation, Houston, TX (US)

( * ) Notice: Subject to any disclaimer, the term of this patent is extended or adjusted under 35 U.S.C. 154(b) by 639 days.

(21) Appl. No.: 17/256,968

(22) PCT Filed: Aug. 6, 2018

(86) PCT No.: PCT/US2018/045365
§ 371 (c)(1),
(2) Date: Dec. 29, 2020

(87) PCT Pub. No.: WO2020/032917
PCT Pub. Date: Feb. 13, 2020

(65) Prior Publication Data
US 2021/0181376 A1 Jun. 17, 2021

(51) Int. Cl.
*G01V 20/00* (2024.01)
*G06Q 10/04* (2023.01)
(Continued)

(52) U.S. Cl.
CPC ............. *G01V 20/00* (2024.01); *G06Q 10/04* (2013.01); *G06Q 50/02* (2013.01); *G09B 25/06* (2013.01)

(58) Field of Classification Search
CPC ...... G01V 99/005; G06Q 10/04; G06Q 50/02; G09B 25/06
(Continued)

(56) References Cited

U.S. PATENT DOCUMENTS

2012/0023118 A1 1/2012 Savary-Sismondini et al.
2016/0209544 A1 7/2016 Minguez et al.
(Continued)

OTHER PUBLICATIONS

Bird, Peter. "An updated digital model of plate boundaries." Geochemistry, Geophysics, Geosystems 4.3 (2003). pp. 1-52. (Year: 2003).*

(Continued)

*Primary Examiner* — John E Johansen
(74) *Attorney, Agent, or Firm* — DeLizio, Peacock, Lewin & Guerra, LLP (57) ABSTRACT

A device comprises a processor; and a memory device including instructions that, when executed by the processor, cause the processor to: obtain, from a server, a plate model, wherein the plate model includes a plurality of geodynamic units (GDUs) representing a plurality of different geological regions; receive a user-defined geospatial data of a desired geological region; perform an intersection operation between the user-defined geospatial data and the plurality of GDUs of the plate model, to assign user-defined geospatial data a GDU identifier; obtain, from a server, Euler rotation poles based on a user-specified geological age, each Euler rotation pole being associated with a GDS via the GDU identifier; and reconstruct the user-defined geospatial data to the geological age using the Euler rotation pole and thereby obtain a reconstructed paleogeographic position of the user-defined geospatial data.

21 Claims, 8 Drawing Sheets

(51) Int. Cl.
  *G06Q 50/02* (2012.01)
  *G09B 25/06* (2006.01)
(58) Field of Classification Search
  USPC .......................................................... 703/6, 10
  See application file for complete search history.

(56) References Cited

U.S. PATENT DOCUMENTS

2018/0052253 A1* 2/2018 Kuhn .................. G01V 99/005
2018/0217283 A1   8/2018 Klinger

OTHER PUBLICATIONS

Smalley Jr, R., et al. "Scotia arc kinematics from GPS geodesy." Geophysical Research Letters 34.21 (2007). pp. 1-6. (Year: 2007).*
Korean Intellectual Property Office, PCT/US2018/045365, International Search Report and Written Opinion, dated Apr. 26, 2019, 12 pages, Korea.
B. Greiner, Euler rotations in plate-tectonic reconstructions, Computers & Geosciences, Apr. 1999, pp. 209-216, vol. 25, No. 3, Pergamon Press (now Imprint of Elsevier), United Kingdom.

* cited by examiner

SECURE RECONSTRUCTION OF GEOSPATIAL DATA

CROSS-REFERENCE TO RELATED APPLICATIONS

This application is a U.S. national stage patent application of International Patent Application No. PCT/US2018/045365, filed on Aug. 6, 2018, the benefit of which is claimed and the disclosure of which is incorporated herein by reference in its entirety.

FIELD

The present description generally relates to predicting the occurrence of subterranean natural resources by reconstructing the paleogeographic position of subterranean portions of Earth's surface.

BACKGROUND

To produce natural resources like hydrocarbons (e.g., oil, gas, etc.) from a subterranean formation, wellbores may be drilled that penetrate hydrocarbon-containing portions of the subterranean formation. The portion of the subterranean formation from which hydrocarbons may be produced is commonly referred to as a "production zone." In some instances, a given subterranean formation may have multiple production zones at various locations along the wellbore.

It may be desirable to determine with improved certainty the presence, quality, and composition of various petroleum systems elements (e.g. source rocks and reservoirs) in the one or more production zones prior to excavation. One way of determining the presence, quality, and composition of the subterranean formation is using maps visualizing geoscience data at their location on Earth as it looked millions of years ago (also referred to as paleogeography), before continents drifted to their present-day arrangement.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The present disclosure relates to a plate tectonic reconstruction application that enables a user to reconstruct geospatial data (e.g., data representing a subterranean formation) from present day to another geological age (in millions of years) using one or more plate tectonic models. By reconstructing the geospatial data, risks involved in hydrocarbon exploration and production may be mitigated, and production efficiency may be increased, as the reconstruction provides better understanding of past geological context of the subterranean formation and make informed geological predictions. According to one or more embodiments described herein, geodynamic units (GDUs) and Euler rotation poles are obtained from the one or more plate tectonic models stored at a remote location (e.g., a remote server) and are processed locally (e.g., on the user's computing device). The user's geospatial data may be considered confidential and therefore it may not be desirable to transmit this data to remote, potentially unsecure facilities for processing. By performing the reconstruction of the geospatial data locally, the confidentiality and security of the user's geospatial data may be maintained.

The reconstruction of geological data to their paleogeographic position is achieved using plate tectonic models which divide the Earth's crust into individual polygons, also referred to as geodynamic units (GDUs), that are linked to Euler rotation poles and allow the GDUs to be reconstructed using mathematical formulae that compute the movement of the GDUs in a spherical coordinate system. The plate tectonic models may also reconstruct user provided geospatial data (points, lines, polygons, raster, and the like) using the GDUs.

As used herein, "reconstructing geospatial data," or variations thereof, refers to a geographical (or geometrical) transformation where geospatial data in the present day is reconstructed (or relocated) to its paleogeographic position using a plate model. Paleogeographic position of geospatial features is calculated using the mathematical formulas of Euler's Theorem that describes the motion of a rigid body (e.g., tectonic plates, in this case) on the surface of a sphere (e.g., Earth, in this case) using Euler rotation poles (including latitude, longitude) and an angle of rotation for a given age.

As used herein, a "Geodynamic Unit (GDU)," or variations thereof, refers to individual geometries (e.g., polygons, data points, lines) that represent individual areas of the Earth's surface. Each GDU is defined by its geometry, and each GDU is assigned an identifier (e.g., a number). Each GDU may have a different geometry (and thus a different identifier) depending on the shape of the Earth's surface that the GDU represents.

As used herein, "plate model," or variations thereof, refers to a geodatabase containing GDUs (including the geometries and identifiers (IDs) thereof) and associated Euler rotation poles (IDs, age, latitude, longitude, angle) table allowing the geographical reconstruction of spatially enabled data through geological age. Euler rotation poles and GDUs are related to each other by a unique GDU identifier (ID). Because more than one Euler rotation pole may be associated with a single GDU for different geological age, multiple Euler rotation poles may have the same identifier (which is the same as the identifier of the associated GDU). It should be noted that, although example embodiments discussed herein are directed to hydrocarbon exploration and production, the inventive principle discussed herein are equally applicable for exploring and producing other subterranean natural resources such as precious metals, metal ores, and the like.

The workflow for reconstructing the geospatial data may generally include selecting user data and input parameters using a local electronic device, obtaining contents of one or more plate models including GDUs and Euler rotation poles from a remote server and storing the obtained contents locally on the electronic device, and performing the plate tectonic reconstruction locally using the electronic device based on one or more desired algorithms.

Figure 1:
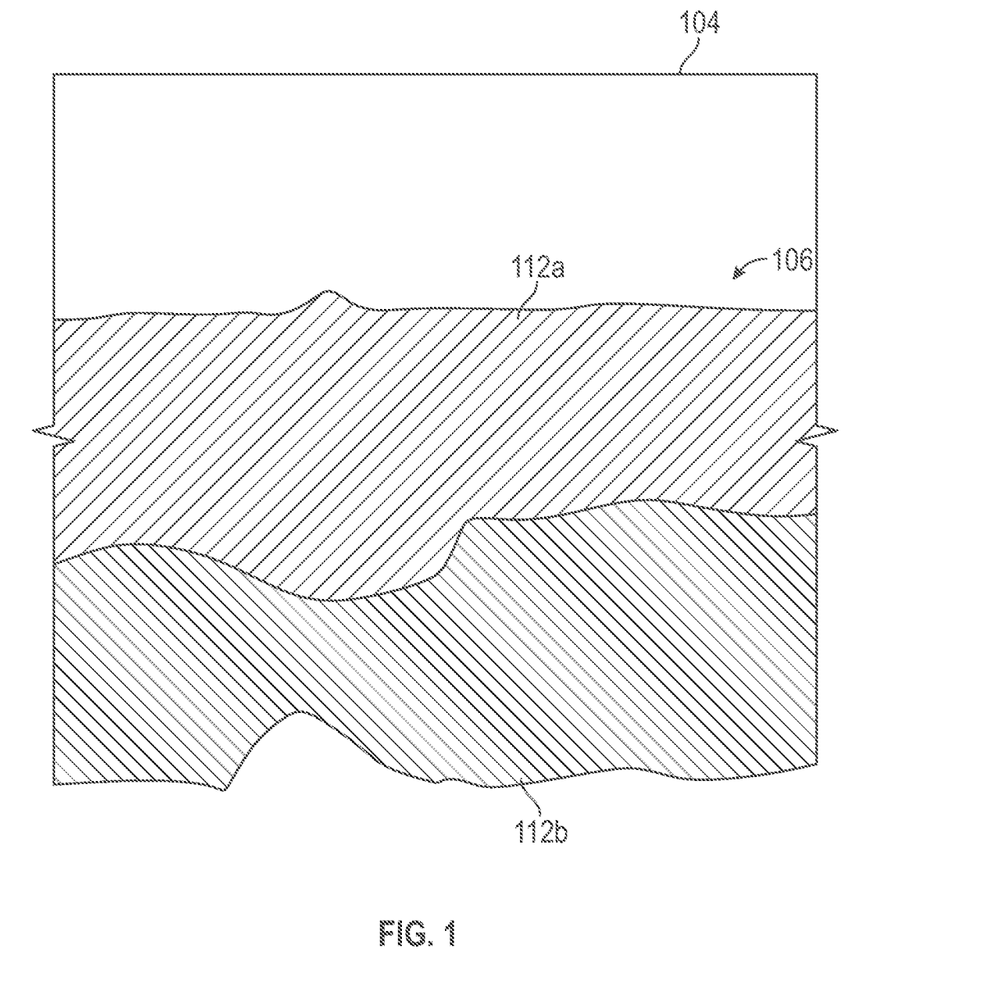
FIG. 1 illustrates an example subterranean formation that is to be reconstructed for determining a composition thereof in accordance with one or more implementations.

FIG. 1 illustrates an example subterranean formation 106 that is reconstructed for determining a composition thereof using the principles of the present disclosure in accordance with one or more implementations. The subterranean formation 106 may be an example of a geological region to be reconstructed. The subterranean formation is located a certain distance from the Earth's surface 104 and includes one or more (two shown) production zones 112a and 112b containing hydrocarbons that are to be produced.

During the production planning phase and/or drilling operations, it may be desirable to create accurate and predictive subsurface geological models to determine the location, distribution and the likely composition of the production zones 112a and 112b. This may reduce the risks involved during exploration, production and drilling operations, and improve the efficiency of these operations by increasing the likelihood of obtaining the desired hydrocarbons and also maximizing hydrocarbon production. The principles disclosed herein may enable wellbore operators to determine the location, distribution and the likely composition of the production zones 112a and 112b by reconstructing the subterranean formation 106 to its paleogeographic position.

Figure 2:
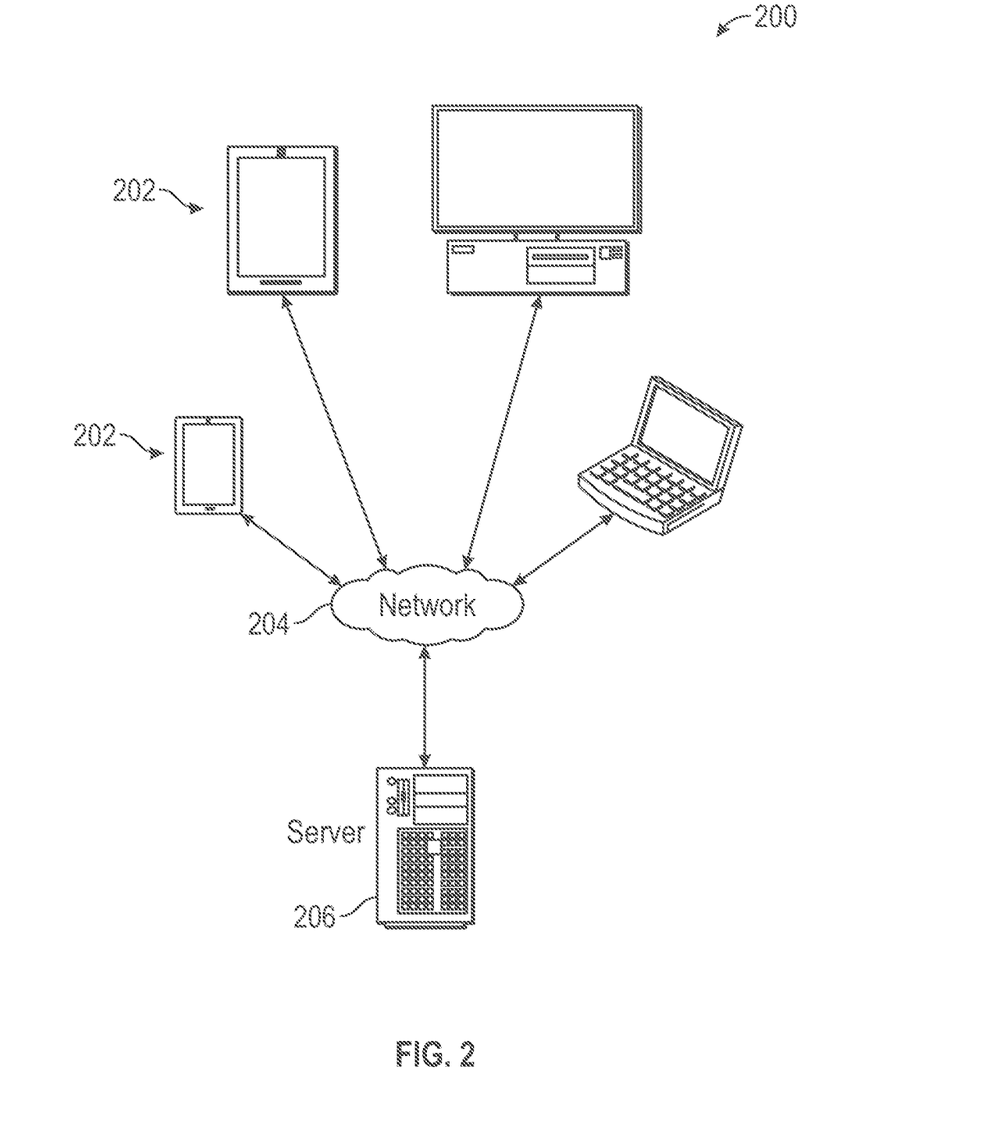
FIG. 2 illustrates an example network environment in which a system for secure reconstruction of geospatial data may be implemented in accordance with one or more implementations.

As discussed herein, different approaches can be implemented in various environments in accordance with the described embodiments. For example, FIG. 2 illustrates an example network environment 200 in which a system for secure reconstruction of geospatial data may be implemented in accordance with one or more implementations. As will be appreciated, although a client-server based network environment is used for purposes of explanation, different network environments may be used, as appropriate, to implement various embodiments. The network environment 200 includes a client device, which can be an electronic device 202 and which can include any appropriate device operable to send and receive requests, messages or information over an appropriate network 204 and convey information back to a user of the electronic device 202. Examples of such an electronic device 202 may include, for example, a personal computer, a mobile device, a tablet device, a laptop computer, and the like.

The network 204 can include any appropriate network, including an intranet, the Internet, a cellular network, a local area network, a public network, a private network, or any other such network or combination thereof. The network 204 could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Computing over the network 204 can be enabled via wired or wireless connections and combinations thereof. In this example, the network includes the Internet, as the environment includes a server 206 representing off-site computing facilities for receiving requests and serving content in response thereto, although for other networks, an alternative device serving a similar purpose could be used.

The server 206 typically will include an operating system that provides executable program instructions for the general administration and operation of that server and typically will include computer-readable medium storing instructions that, when executed by a processor of the server, allow the server to perform its intended functions. The network environment 200 in one or more implementations is a distributed computing environment utilizing several computer systems and components that are interconnected via computing links, using one or more computer networks or direct connections. However, the depiction of the network environment 200 in FIG. 1 should be taken as being illustrative in nature and not limiting to the scope of the disclosure.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the electronic device 202 and/or the server 206.

Figure 3:
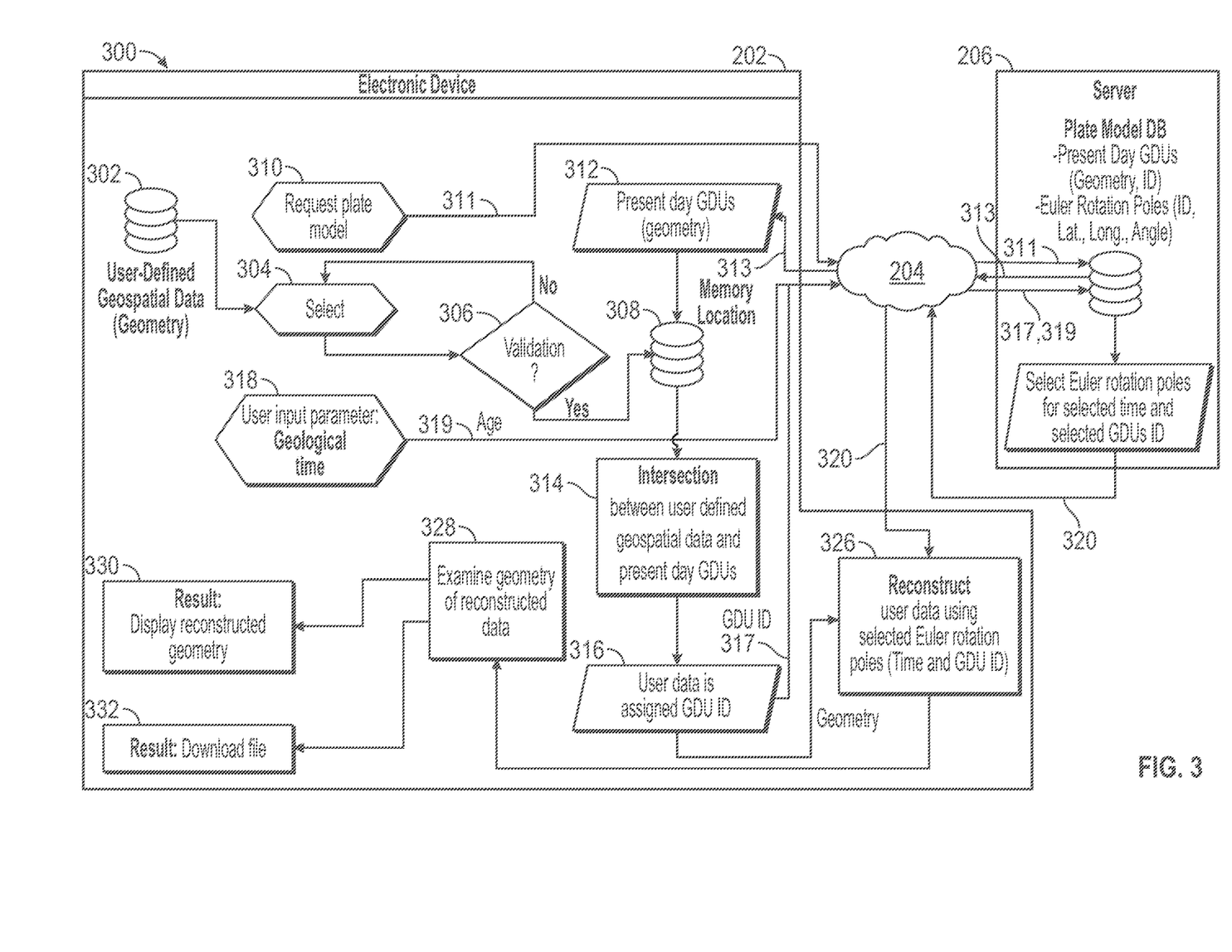
FIG. 3 conceptually illustrates a workflow of a system for secure reconstruction of geospatial data in accordance with one or more implementations.

FIG. 3 conceptually illustrates a workflow 300 of a system for secure reconstruction of geospatial data in accordance with one or more implementations. Although FIG. 3, as well as other process illustrations contained in this disclosure may depict functional steps in a particular sequence, the processes are not necessarily limited to the particular order or steps illustrated. The various steps portrayed in this or other figures can be changed, rearranged, performed in parallel or adapted in various ways. Furthermore, it is to be understood that certain steps or sequences of steps can be added to or omitted from the process, without departing from the scope of the various implementations.

The workflow 300 may be implemented by one or more (one shown) electronic devices 202 and/or a server 206 communicating with each other over network 204. The electronic device 202 may execute a plate tectonic reconstruction application for reconstructing a subterranean formation. The plate tectonic reconstruction application may be installed locally on the electronic device 202 or may be an internet-based application, such as a web application or a mobile application, and a user may access/interact with the plate tectonic reconstruction application via a user interface provided by the electronic device 202, such as a web browser.

As illustrated, the workflow 300 may include selecting user data stored on the electronic device 202 at 302 and 304. For example, the user data may include user-defined geospatial data (e.g., points, lines, polygons, raster, and the like) to be reconstructed, which may be geospatial data representing a desired geological region (e.g., the subterranean formation 106 (FIG. 1)). The user data may be selected using the user-interface provided by the plate tectonic reconstruction application on the electronic device 202. For example, the user-interface may be provided on a display of the electronic device 202 or on a display device communicably coupled to the electronic device 202. In an example, the user data may be included in a static file such as a geographic information system (GIS) file, and the like, stored (302) on the electronic device 202. In other examples, the user data may be stored (302) in a relational database.

Once the user data has been selected (304), the user data (or more specifically, the user geometry) may be validated, at 306. The user-defined geospatial data may be different from the geometry in the GDUs. Validating the user-defined geospatial data may ensure that the geometry is correctly defined (e.g., ensuring that the polygons are not defined by less than 3 points, or the co-ordinates of the polygon vertices do not overlap). Validating the user-defined geospatial data, at 306, may also include determining whether the reference coordinate system used in the user-defined geospatial data is correct, performing geospatial checks (e.g., ensuring that latitude and longitude values are valid), and the like.

In an example, the validation process may be performed via a program or subroutine (e.g., a JavaScript program code) of the reconstruction application executing on the electronic device 202. If the validation process determines that the user-defined geometry is acceptable (YES at 306), the validated user-defined geospatial data may be stored in a memory of the electronic device 202, at 108. If the validation process determines that the user-defined geospatial data is unacceptable (NO at 306), the user may be provided with the reason(s) the user-defined geospatial data is unacceptable, for example, via a message on the user interface, and a new (or revised) user-defined geospatial data may be selected.

The workflow 300 may also include requesting a desired plate model from the server 206, at 310. When requesting the plate model, a user may send a request to the server 206, at 311, and a plate model stored on the server 206 may be provided based on the user selection. The plate model may be one of multiple plate models that are stored on the server 206. The multiple plate models may be provided by different plate model vendors. The plate models may include the present day GDUs (including the respective geometries and identifiers). In response (313), the selected plate model may then be received, at 312, and stored in the electronic device 202.

Using the received plate model and the user-defined geospatial data, an intersection operation may be performed at 314 between the user-defined geospatial data and present day GDUs (geometry and ID) obtained from the plate model. As an example, and used herein, an intersection operation may include selecting geological features that represent the user-defined geospatial data and the present day GDUs. Based on the intersection operation, the user-defined geospatial data are assigned the corresponding GDU identifier, at 316. The assigned GDU identifier may be then provided to the server 206, at 317.

The user may then specify a desired geological age of reconstruction (in millions of years), at 318, using the user-interface provided by the plate tectonic reconstruction application on electronic device 202. The user-specified geological age may be provided to the server 206, at 319. Using the desired geological age obtained at 319, Euler rotation poles may be obtained, at 320. Specifically, based on the geological age, only the relevant Euler rotation poles for that specific geological age are downloaded from the server 206 to the electronic device 202.

At 326, reconstruction of the user-defined geospatial data is performed locally using the Euler rotation poles (obtained at 320) and mathematical formulas from Euler's theorem of geographical movement of a rigid body (tectonic plates, in this case) on the surface of a sphere (in this case, the surface of the Earth). As discussed above, performing the reconstruction locally ensures that the confidentiality of the user's geospatial data is maintained, and reduces the security risks involved with transmitting the user's geospatial data to a remote location (server outside the user's company/organization).

At 328, the reconstructed geometry may be examined to correct geometrical errors that occur due to the +/−180° longitude dateline or Earth's North/South poles (+/−90° latitude). For example, a polygon geometry that is crossed by the dateline will need to be split into two polygons so that the positive coordinates are displayed on one side and the negative coordinates on the other side of the date line. If that correction is not applied, the orientation of the geometry may be interpreted and an incorrect geometry will be obtained. Rectifying geometries in this way involves inserting vertices along the dateline in order to close the polygons The corrected result may be provided, at 330. For example, the corrected result may be provided on a display of the electronic device 202 or on a display device communicably coupled to the electronic device 202. Alternatively, or additionally, the corrected results can be downloaded as a file (e.g. a GIS file), at 332. For example, the corrected result may be downloaded via an option presented by the plate tectonic reconstruction application on the electronic device 202.

The results of the user's geospatial data reconstruction provide a modelled paleo-location of the data at a certain geological age. These results can be used to predict with improved certainty the presence of geological resources of interest and paleo-environmental or paleo-climatic factors that had an influence on the quality or quantity of the geological resources (e.g., minerals or hydrocarbon resources).

Embodiments disclosed herein provide numerous advantages over the prior art. It allows the user to reconstruct data directly in the web-browser environment of their electronic device by downloading all the elements (Euler formula's, GDUs, rotation poles for the geological age of interest) necessary to perform a reconstruction of the data. Furthermore, embodiments disclosed provide a secure environment for performing the data reconstruction since the user data is handled locally (e.g., in the electronic device 202) and is not transmitted to remote and potentially unsecure locations for processing. This contrasts with existing technologies where user had to upload data to a distant server where they used to be reconstructed, and the results were then downloaded back to the user's electronic device once processed. In addition, embodiments disclosed include the data validation process (306) that checks the user data before the user data is reconstructed. Embodiments disclosed also include a correction process (328) for correcting errors that occur due to the +/−180° longitude dateline or Earth's North/South poles (+/−90° latitude). The workflow 300, according to the disclosed embodiments, provides a relatively faster processing since only Euler rotation poles for the identifiers of the GDUs obtained from the geospatial intersection operation (314) are downloaded from the server 206.

Figure 4:
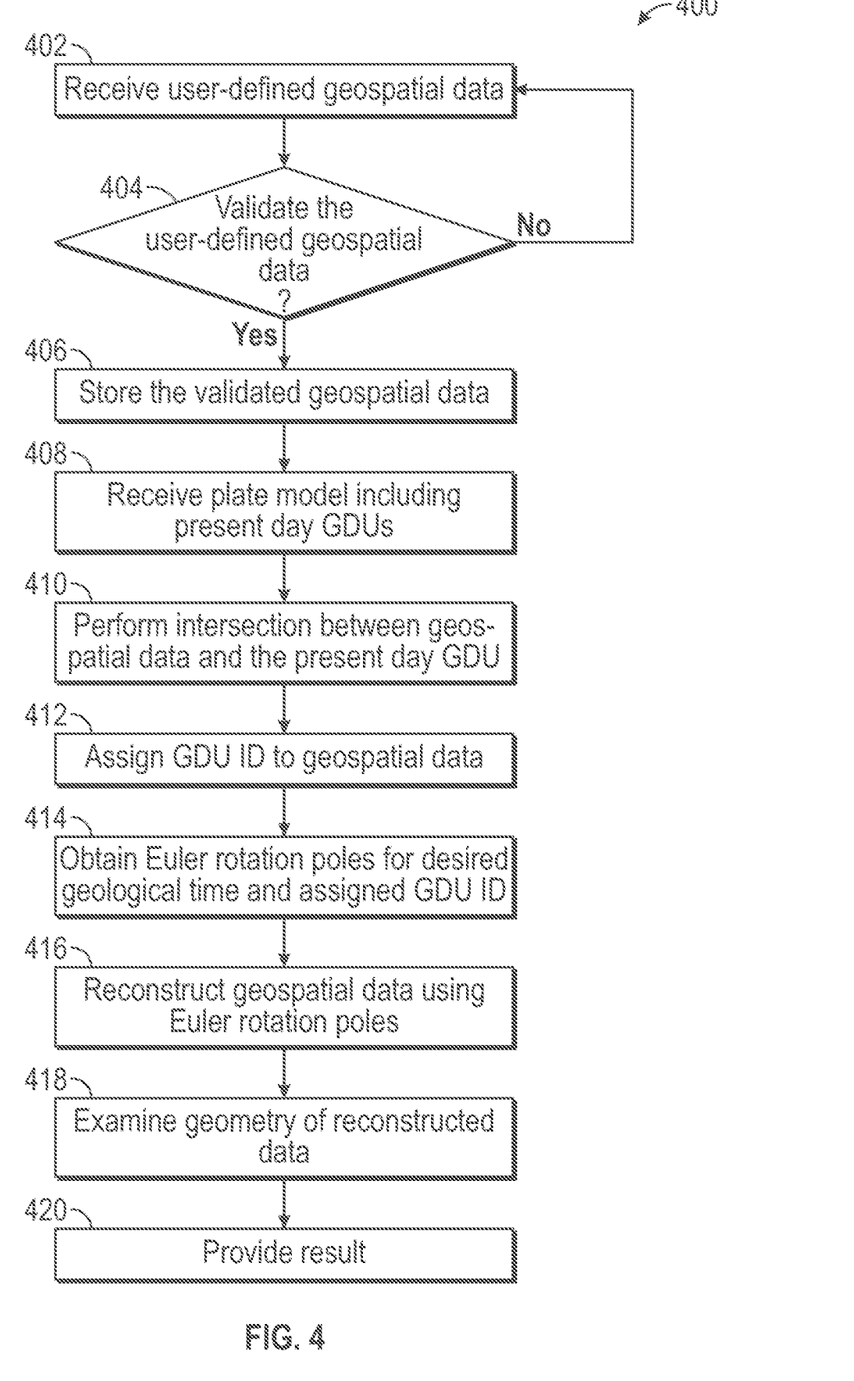
FIG. 4 illustrates a flow diagram of an example process of an electronic device in a system for secure reconstruction of geospatial data in accordance with one or more implementations.

FIG. 4 illustrates a flow diagram of an example process 400 of an electronic device 202 in a system for secure reconstruction of geospatial data in accordance with one or more implementations. The process 400 may be performed by the electronic device 202 (FIG. 2) and begins with the electronic device 202 receiving user-defined geospatial data, at block 402. The geospatial data is then validated, at block 404. The user-defined geometries in the user data may be different from the geometries in the GDUs. Validating the user data may ensure that the geometries therein are correctly defined (e.g., ensuring that the polygons are not defined by less than 3 points, or the co-ordinates of the polygon vertices do not overlap). Validating the user data may also include determining whether the reference coordinate system used in the user data is correct, performing geospatial checks (e.g., ensuring that latitude and longitude values are valid), and the like. If the geospatial data is not valid, then new (or revised) user data may be selected. The user may be provided with the reason why the user data is unacceptable, for example.

If the geospatial data is valid, then at block 406, the geospatial data may be stored locally on the electronic device 202. A plate model including the present day GDUs (including the respective geometries and identifiers) and the Euler rotation poles (including the respective identifiers (IDs), latitudes, longitudes, angles of rotation) is obtained from the server 206 (FIG. 2), at block 408.

At block 410, an intersection operation may then be performed between the geospatial data and the present day GDU using the electronic device 202. Based on the intersection operation, a GDU ID included in the plate model may be assigned to the geospatial data, at block 412. Euler rotation poles are then obtained from the server 206 for a desired geological age (also referred to as reconstruction age) and the assigned GDU ID, at block 414. For example, the electronic device 202 may prompt the user to input the desired geological age, and responsive to the prompt the electronic device 202 may receive user input indicating the desired geological age.

The geospatial data is then reconstructed using the Euler rotation poles, at block 416. The reconstructed data is then examined for correctness, at block 418, and the corrected reconstructed data is then provided at block 420. Based on the corrected reconstructed data, a composition of the subterranean formation is determined.

Figure 5:
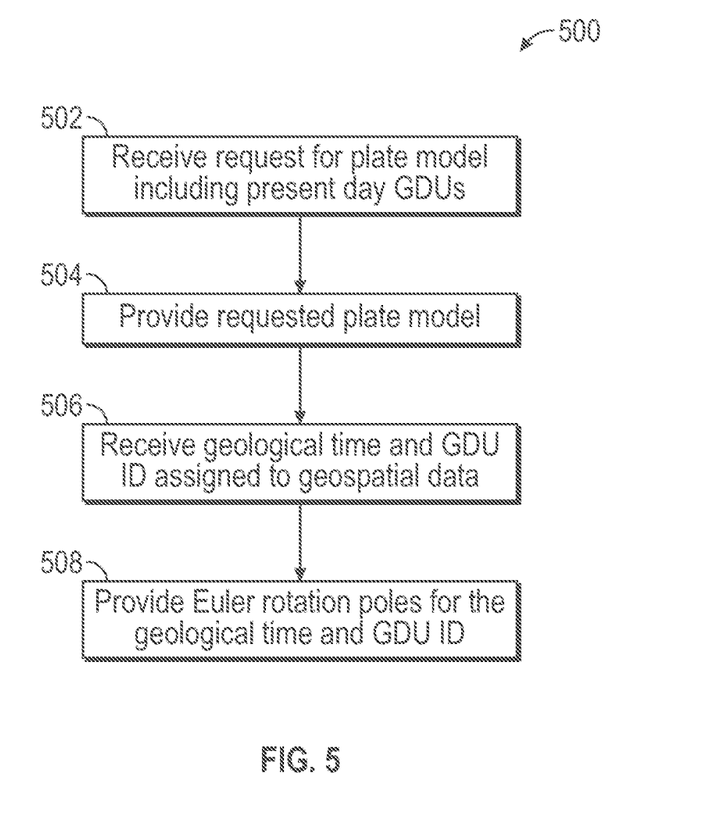
FIG. 5 illustrates a flow diagram of an example process of a server in a system for secure reconstruction of geospatial data in accordance with one or more implementations.

FIG. 5 illustrates a flow diagram of an example process 500 of a server 206 in a system for secure reconstruction of geospatial data in accordance with one or more implementations. The process 500 begins at block 502 when the server 206 receives a request for a plate model including present day GDUs from the electronic device 202. In response, the server 206 transmits the requested plate model including the present day GDUs to the electronic device 202 at block 504. At block 506, the server 206 receives a desired geological age and a GDU ID assigned to the user-defined geospatial data from the electronic device 202. At block 508, the server 206 transmits Euler rotation poles for the reconstruction age (e.g., the desired geological age) and assigned GDU ID to the electronic device 202.

Figure 6:
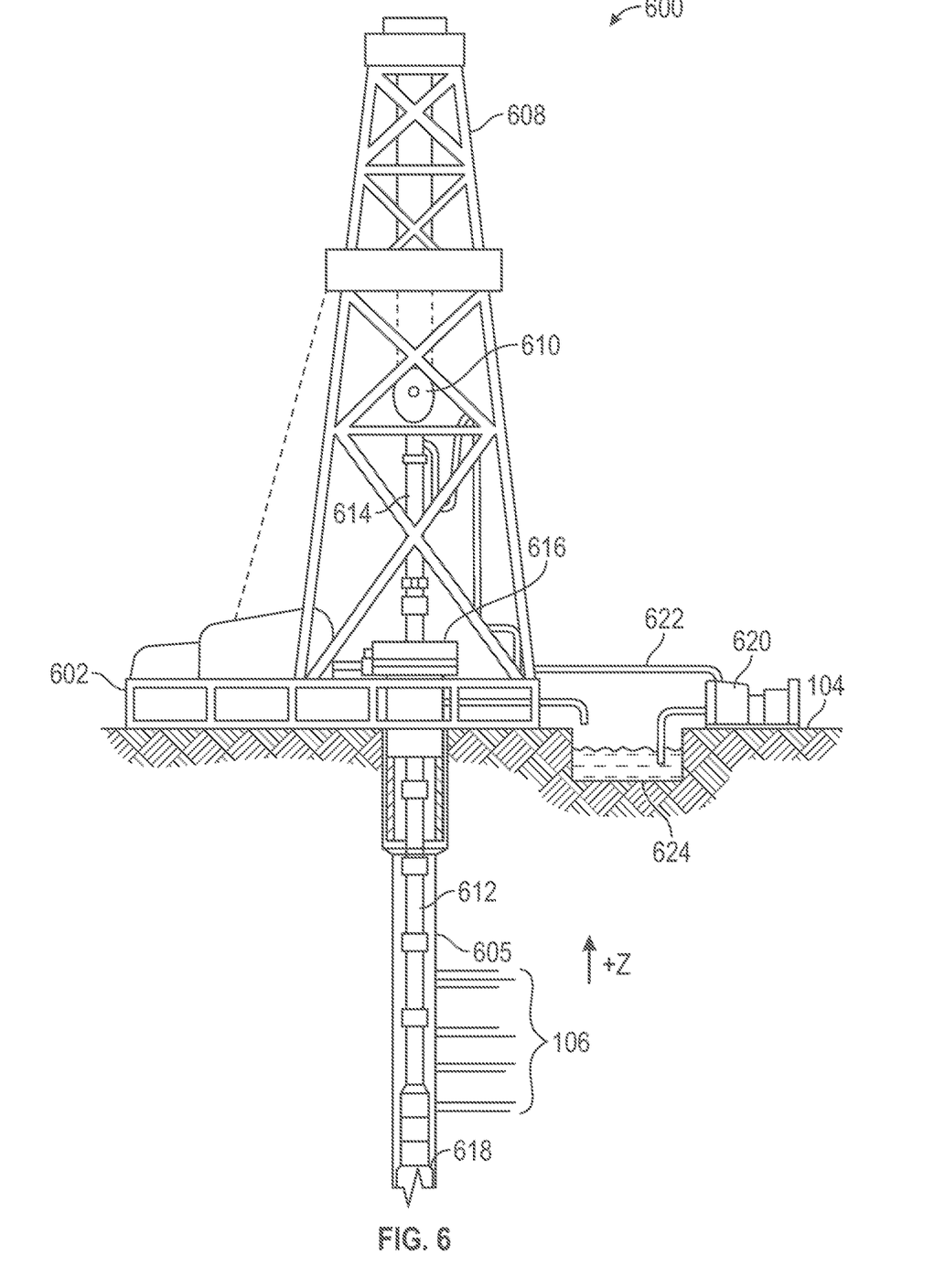
FIG. 6 is a schematic diagram of an example drilling system that may employ the principles of the present disclosure in accordance with one or more implementations.
Figure 7:
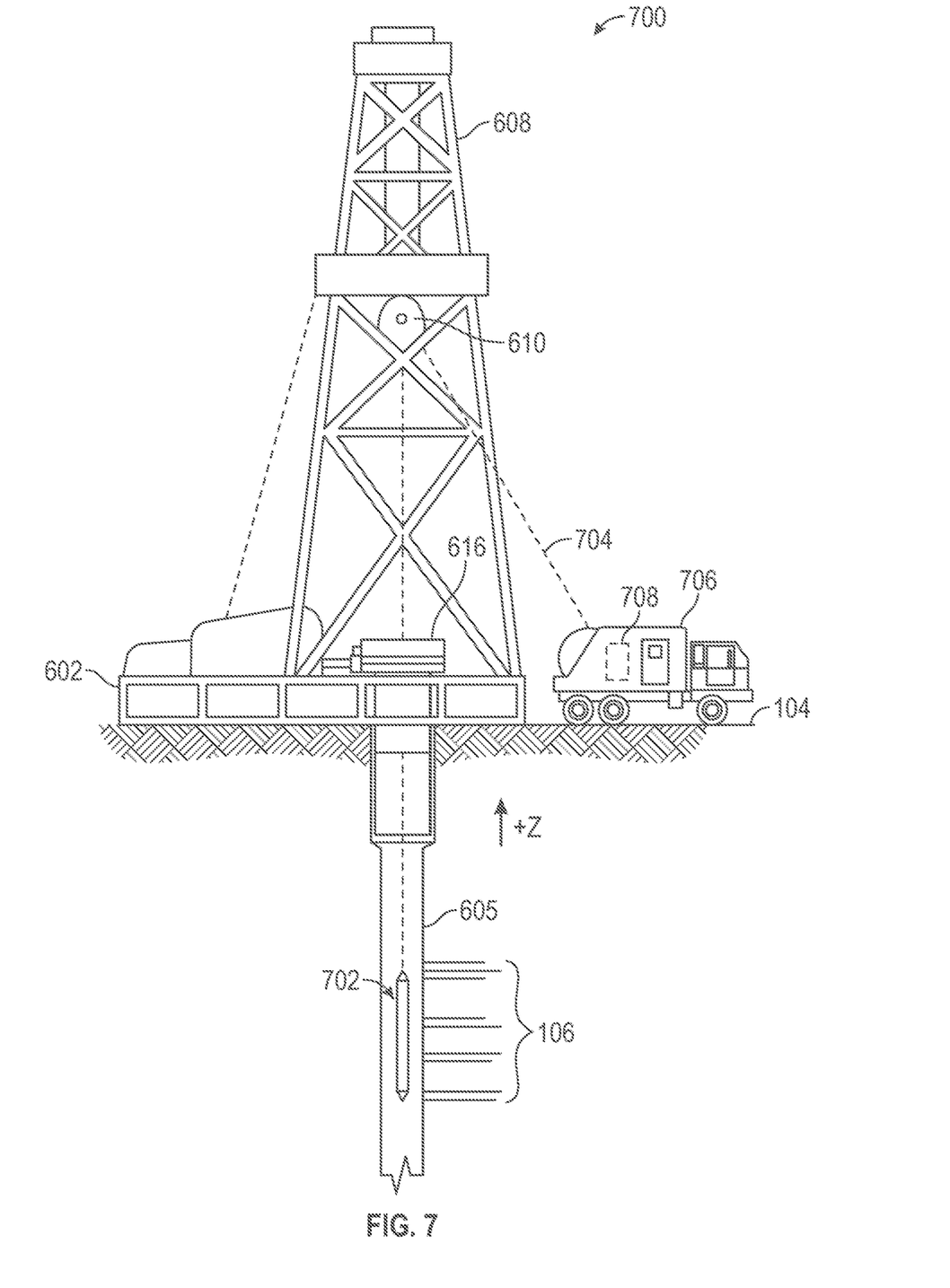
FIG. 7 is a schematic diagram of an example wireline system that may employ the principles of the present disclosure in accordance with one or more implementations.

The following discussion in FIGS. 6 and 7 relate to examples of a drilling system 600 and wireline system 700 that may be implemented for obtaining hydrocarbons from the production zones 112a and 112b (FIG. 1) based on the reconstructed geospatial data obtained from the workflow 300 (FIG. 3).

FIG. 6 is a schematic diagram of an example drilling system 600 that may employ the principles of the present disclosure in accordance with one or more implementations. In an example, the trajectory of the drill bit 618 may be adjusted in view of the reconstructed geospatial data Obtained using the workflow 300 of FIG. 3. As illustrated, the drilling system 600 may include a drilling platform 602 positioned at the surface 104 a wellbore 605 that extends from the drilling platform 602 into a subterranean formation 106 including one or more production zones.

The drilling system 600 may include a derrick 608 supported by the drilling platform 602 and having a traveling block 610 for raising and lowering a drill string 612. A kelly 614 may support the drill string 612 as it is lowered through a rotary table 616. A drill bit 618 may be coupled to the drill string 612 and driven by a downhole motor and/or by rotation of the drill string 612 by the rotary table 616. As the drill bit 618 rotates, it creates the wellbore 605, which penetrates the subterranean formations 106. A pump 620 may circulate drilling fluid through a feed pipe 622 and the kelly 614, downhole through the interior of drill string 612, through orifices in the drill bit 618, back to the surface via the annulus defined around drill string 612, and into a retention pit 624. The drilling fluid cools the drill bit 618 during operation and transports cuttings from the wellbore 604 into the retention pit 624.

The drilling system 600 may further include a bottom hole assembly (BHA) coupled to the drill string 612 near the drill bit 618. The BHA may comprise various downhole measurement tools such as, but not limited to, measurement-while-drilling (MWD) and logging-while-drilling (LWD) tools, which may be configured to take downhole measurements of drilling conditions.

As the drill bit 618 extends the wellbore 605 through the subterranean formation 106, the various downhole measurement tools may continuously or intermittently collect data from the subterranean formation 106.

At various times during the drilling process, the drill string 612 may be removed from the wellbore 605, as shown in FIG. 7, to conduct measurement/logging operations. More particularly, FIG. 7 depicts a schematic diagram of an example wireline system 700 that may employ the principles of the present disclosure in accordance with one or more implementations. Like numerals used in FIGS. 6 and 7 refer to the same components or elements and, therefore, may not be described again in detail. As illustrated, the wireline system 700 may include a wireline instrument sonde 702 that may be suspended in the wellbore 605 on a cable 704. The sonde 702 may include the various downhole measurement tools described above, which may be communicably coupled to the cable 704. The cable 704 may include conductors for transporting power to the sonde 702 and also facilitate communication between the surface and the sonde 702. A logging facility 706, shown in FIG. 7 as a truck, may collect measurements from the various downhole measurement tools, and may include computing and data acquisition systems 708 for controlling, processing, storing, and/or visualizing the measurements gathered by the various downhole measurement tools. In an example, the controlling, processing, storing, and/or visualizing of the measurements may be performed in view of the reconstructed geospatial data obtained using the workflow 300 of FIG. 3. The computing and data acquisition systems 708 may be communicably coupled to the various downhole measurement tools by way of the cable 704.

Even though FIGS. 6 and 7 depict the systems 600 and 700 including vertical wellbores, it should be understood by those skilled in the art that principles of the present disclosure are equally well suited for use in wellbores having other orientations including horizontal wellbores, deviated wellbores, slanted wellbores or the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIGS. 6 and 7 depict an onshore operation, it should be understood by those skilled in the art that principles of the present disclosure are equally well suited for use in offshore operations, wherein a volume of water may separate the drilling platform 602 and the wellbore 605.

Figure 8:
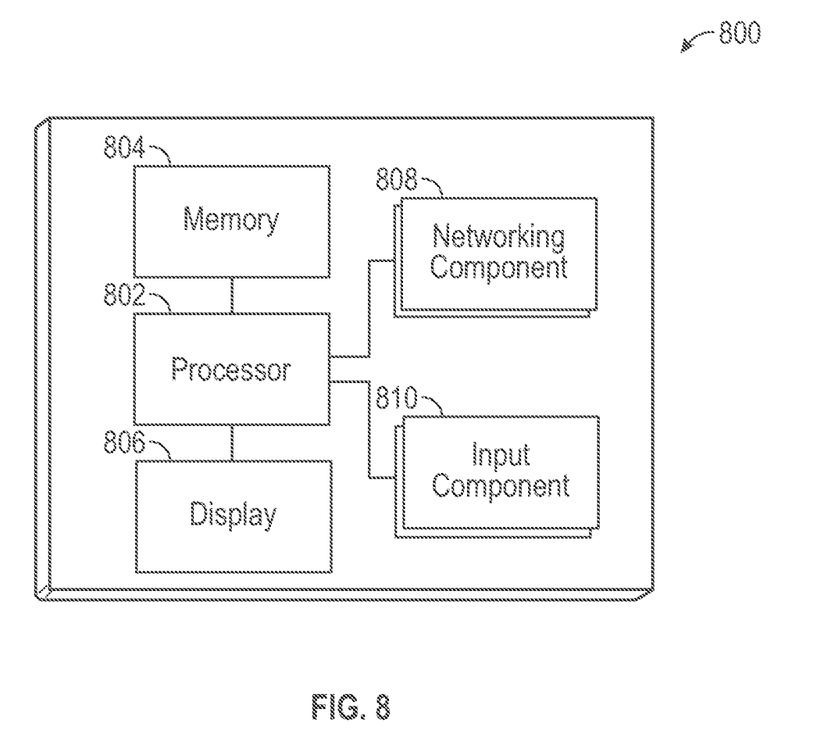
FIG. 8 illustrates a schematic diagram of a set of general components of an example computing device.

FIG. 8 illustrates a schematic diagram of a set of general components of an example computing device 800. In one or more implementations, one or more of the electronic device 202 or the server 206 may include all or part of the computing device 800. In this example, the computing device 800 includes a processor 802 for executing instructions that can be stored in a memory device or element 804. The computing device 800 can include many types of memory, data storage, or non-transitory computer-readable storage media, such as a first data storage for program instructions for execution by the processor 802, a separate storage for images or data, a removable memory for sharing information with other devices, etc.

The computing device 800 typically may include some type of display element 806, such as a touch screen or liquid crystal display (LCD). As discussed, the computing device 800 in many embodiments will include at least one input element 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such the computing device 800 might not include any buttons at all, and might be controlled only through a combination of visual and audio commands, such that a user can control the computing device 800 without having to be in contact with the computing device 800. In some embodiments, the computing device 800 of FIG. 8 can include one or more network interface elements 808 for communicating over various networks, such as a Bluetooth, RF, wired, or wireless communication systems. The computing device 800 in many embodiments can communicate with a network, such as the Internet, and may be able to communicate with other such computing devices.

Embodiments Disclosed Herein Include:

Embodiment A. A device, comprising: a processor; and a memory device including instructions that, when executed by the processor, cause the processor to: obtain, from a server, a plate model, wherein the plate model includes a plurality of geodynamic units (GDUs) representing a plurality of different geological regions; receive a user-defined geospatial data of a desired geological region; perform an intersection operation between the user-defined geospatial data and the plurality of GDUs of the plate model, to assign user-defined geospatial data a GDU identifier; obtain, from a server, Euler rotation poles based on a user-specified geological age, each Euler rotation pole being associated with a GDU via the GDU identifier; and reconstruct the user-defined geospatial data to the geological age using the Euler rotation pole and thereby obtain a reconstructed paleogeographic position of the user-defined geospatial data Embodiment B. A method, comprising: obtaining, from a server, a plate model, wherein the plate model includes a plurality of geodynamic units (GDUs) representing a plurality of different geological regions; receiving a user-defined geospatial data of a desired geological region; performing an intersection operation between the user-defined geospatial data and the plurality of GDUs of the plate model, to assign the user-defined geospatial data a GDU identifier; obtaining, from a server, a Euler rotation pole based on a user-specified geological age, each Euler rotation pole being associated with a GDU via the GDU identifier; and reconstructing the user-defined geospatial data to the geological age using the Euler rotation pole and thereby obtain a reconstructed paleogeographic position of the user-defined geospatial data.

Embodiment C. A non-transitory computer-readable medium including instructions stored therein that, when executed by at least one computing device, cause the at least one computing device to: obtain, from a server, a plate model, wherein the plate model includes a plurality of geodynamic units (GDUs) representing a plurality of different geological regions; receive a user-defined geospatial data of a desired geological region; perform an intersection operation between the user-defined geospatial data and the plurality of GDUs of the plate model, to assign the user-defined geospatial data corresponding GDU identifiers; obtain, from a server, Euler rotation poles based on a user-specified geological age, each Euler rotation pole being associated with a GDU via the GDU identifier; and reconstruct the user-defined geospatial data to the geological age using the Euler rotation pole and thereby obtain a reconstructed paleogeographic position of the user-defined geospatial data.

Each of embodiments A, B, and C may have one or more of the following additional elements in any combination. Element 1: wherein the instructions further cause the processor to: provide the reconstructed geometry to facilitate exploration of a desired natural resource. Element 2: wherein each GDU in the plate model represents a geometry of a geological region of the plurality of different geological regions, and each GDU is associated with an identifier, and wherein the instructions further cause the processor to: assign, to the user-defined geospatial data, the identifier of the GDU identified from the intersection operation; and obtain, from the server, the Euler rotation poles based on the user-specified geological age and the identifier assigned to the GDU. Element 3: wherein the instructions further cause the processor to: display the reconstructed geometry for identifying a composition of the reconstructed geological region. Element 4: wherein the instructions further cause the processor to: provide the reconstructed geometry as a geographic information system (GIS) file. Element 5: wherein the instructions further cause the processor to: validate the user-defined geospatial data to determine whether the user-defined geospatial data is correctly defined, to determine whether a reference coordinate system used for user-defined geospatial data is correct, or to ensure that latitude and longitude values in the user-defined geospatial data are valid. Element 6: wherein the instructions further cause the processor to: store the validated user-defined geospatial data and the GDUs obtained from the plate model in the memory device. Element 7: wherein the instructions further cause the processor to: correct geometrical errors in the reconstructed geometry due to the +/−180° longitude dateline or Earth's North/South poles (+/−90 latitude).

Element 8: further comprising: providing the reconstructed geometry to facilitate exploration of a desired natural resource. Element 9: wherein each GDU in the plate model includes a geometry of a geological region of the plurality of different geological regions, each GDU is associated with an identifier, and the method further comprises: assigning, to the user-defined geospatial data, the identifier of the GDU identified from the intersection operation; and obtaining, from the server, the Euler rotation poles based on the user-specified geological age and the identifier assigned to the GDU. Element 10: further comprising: displaying the reconstructed geometry for identifying a composition of the reconstructed geological region. Element 11: further comprising: providing the reconstructed geometry as a geographic information system (GIS) file, Element 12: further comprising: validating the user-defined geospatial data to determine whether the user-defined geospatial data is correctly defined, to determine whether a reference coordinate system used for user-defined geospatial data is correct, or to ensure that latitude and longitude values in the user-defined geospatial data are valid. Element 13: further comprising: storing the validated user-defined geospatial data and the GDUs obtained from the plate model. Element 14: further comprising: correcting geometrical errors in the reconstructed geometry due to the +/−180° longitude dateline or Earth's North/South poles (+/−90 latitude).

Element 15: wherein executing the instructions further causes the at least one computing device to: provide the reconstructed geometry to facilitate exploration of a desired natural resource. Element 16: wherein each GDU in the plate model represents a geometry of a geological region of the plurality of different geological regions, and each GDU is associated with an identifier, and executing the instructions further causes the at least one computing device to: assign, to the user-defined geospatial data, the identifier of the GDU identified from the intersection operation; and obtain, from the server, the Euler rotation poles based on the user-specified geological age and the identifier assigned to the GDU. Element 17: wherein executing the instructions further causes the at least one computing device to: display the reconstructed geometry for identifying a composition of the reconstructed geological region. Element 18: wherein executing the instructions further causes the at least one computing device to: provide the reconstructed geometry as a geographic information system (GIS) file. Element 19: wherein executing the instructions further causes the at least one computing device to: validate the user-defined geospatial data to determine whether the user-defined geospatial data is correctly defined, to determine whether a reference coordinate system used for user-defined geospatial data is correct, or to ensure that latitude and longitude values in the user-defined geospatial data are valid. Element 20: wherein executing the instructions further causes the at least one computing device to: store the validated user-defined geospatial data and the GDUs obtained from the plate model. Element 21: wherein executing the instructions further causes the at least one computing device to: correct geometrical errors in the reconstructed geometry due to the +/−180° longitude dateline or Earth's North/South poles (+/−90 latitude).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

By way of non-limiting example, exemplary combinations applicable to A, B, and C include: Element 5 with Element 6; Element 12 with Element 13; and Element 19 with Element 20.

Headings and subheadings, if any, are used for convenience only and do not limit the disclosure. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference.

Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device comprising:
   a processor; and
   a memory device connected to the processor, the memory device including instructions that, when executed by the processor, cause the processor to:
   obtain, from at least one server accessed over a network, a plate model, wherein the plate model includes one or more geodynamic units (GDUs), each GDU including a GDU identifier, each GDU representing a different geological region;
   receive a user-defined geospatial data of a desired geological region;
   perform an intersection operation between the user-defined geospatial data and the plurality of GDUs of the plate model, the intersection operation assigning one of the GDU identifiers to the user-defined geospatial data;
   obtain, from at least one of the servers, one or more Euler rotation poles, each Euler rotation pole based on a user-specified geological age, each Euler rotation pole being associated with one of the GDUs via the GDU identifier of the associated GDU; and
   reconstruct the user-defined geospatial data to the user-specified geological age using the Euler rotation pole for the user-specified geological age at the assigned GDU identifier, the reconstruction a reconstructed paleogeographic position of the user-defined geospatial data at the user-specified geological age.

2. The device of claim 1, wherein the instructions further cause the processor to:
   provide the reconstructed geometry to facilitate exploration of a desired natural resource.

3. The device of claim 1, wherein the instructions further cause the processor to:
   display the reconstructed paleogeographic position of the user-defined geospatial data for the user-specified geological age.

4. The device of claim 1, wherein the instructions further cause the processor to:
   store the reconstructed paleogeographic position of the user-defined geospatial data for the user-specified geological age as a geographic information system (GIS) file.

5. The device of claim 1, wherein the instructions further cause the processor to:
   validate the user-defined geospatial data to determine whether the user-defined geospatial data is correctly defined, to determine whether a reference coordinate system used for user-defined geospatial data is correct, or to ensure that latitude and longitude values in the user-defined geospatial data are valid.

6. The device of claim 5, wherein the instructions further cause the processor to:
   store the validated user-defined geospatial data and the GDUs obtained from the plate model in the memory device.

7. The device of claim 1, wherein the instructions further cause the processor to:
   correct geometrical errors in the reconstructed geometry due to the +/−180° longitude dateline or Earth's North/South poles (+/−90 latitude).

8. A method, comprising:
   obtaining, from at least one server accessed over a network, a plate model, wherein the plate model includes one or more geodynamic units (GDUs), each GDU including a GDU identifier, each GDU representing a different geological region;
   receiving a user-defined geospatial data of a desired geological region;
   performing an intersection operation between the user-defined geospatial data and the plurality of GDUs of the plate model, the intersection operation assigning one of the GDU identifiers to the user-defined geospatial data;
   obtaining, from at least one of the servers, one or more Euler rotation poles, each Euler rotation pole based on a user-specified geological age, each Euler rotation pole being associated with one of the GDUs via the GDU identifier of the associated GDU; and
   reconstructing the user-defined geospatial data to the user-specified geological age using the Euler rotation pole for the user-specified geological age at the assigned GDU identifier, the reconstruction a reconstructed paleogeographic position of the user-defined geospatial data at the user-specified geological age.

9. The method of claim 8, further comprising:
providing the reconstructed geometry to facilitate exploration of a desired natural resource.

10. The method of claim 8, further comprising:
displaying the reconstructed paleogeographic position of the user-defined geospatial data for the user-specified geological age.

11. The method of claim 8, further comprising:
storing the reconstructed paleogeographic position of the user-defined geospatial data for the user-specified geological age as a geographic information system (GIS) file.

12. The method of claim 8, further comprising:
validating the user-defined geospatial data to determine whether the user-defined geospatial data is correctly defined, to determine whether a reference coordinate system used for user-defined geospatial data is correct, or to ensure that latitude and longitude values in the user-defined geospatial data are valid.

13. The method of claim 12, further comprising:
storing the validated user-defined geospatial data and the GDUs obtained from the plate model.

14. The method of claim 8, further comprising:
correcting geometrical errors in the reconstructed geometry due to the +/−180° longitude dateline or Earth's North/South poles (+/−90 latitude).

15. A non-transitory computer-readable medium including instructions stored therein that, when executed by at least one computing device, cause the at least one computing device to:
obtain, from at least one server accessed over a network, a plate model, wherein the plate model includes one or more geodynamic units (GDUs), each GDU including a GDU identifier, each GDU representing a different geological region;
receive a user-defined geospatial data of a desired geological region;
perform an intersection operation between the user-defined geospatial data and the plurality of GDUs of the plate model, the intersection operation assigning one of the GDU identifiers to the user-defined geospatial data;
obtain, from at least one of the servers, one or more Euler rotation poles, each Euler rotation pole based on a user-specified geological age, each Euler rotation pole being associated with one of the GDUs via the GDU identifier of the associated GDU; and
reconstruct the user-defined geospatial data to the user-specified geological age using the Euler rotation pole for the user-specified geological age at the assigned GDU identifier, the reconstruction a reconstructed paleogeographic position of the user-defined geospatial data at the user-specified geological age.

16. The non-transitory computer-readable medium of claim 15, wherein executing the instructions further causes the at least one computing device to:
provide the reconstructed geometry to facilitate exploration of a desired natural resource.

17. The non-transitory computer-readable medium of claim 15, wherein executing the instructions further causes the at least one computing device to:
display the reconstructed paleogeographic position of the user-defined geospatial data for the user-specified geological age.

18. The non-transitory computer-readable medium of claim 15, wherein executing the instructions further causes the at least one computing device to:
store the reconstructed paleogeographic position of the user-defined geospatial data for the user-specified geological age as a geographic information system (GIS) file.

19. The non-transitory computer-readable medium of claim 15, wherein executing the instructions further causes the at least one computing device to:
validate the user-defined geospatial data to determine, whether the user-defined geospatial data is correctly defined, to determine whether a reference coordinate system used for user-defined geospatial data is correct, or to ensure that latitude and longitude values in the user-defined geospatial data are valid.

20. The non-transitory computer-readable medium of claim 19, wherein executing the instructions further causes the at least one computing device to:
store the validated user-defined geospatial data and the GDUs obtained from the plate model.

21. The non-transitory computer-readable medium of claim 15, wherein executing the instructions further causes the at least one computing device to:
correct geometrical errors in the reconstructed geometry due to the +/−180° longitude dateline or Earth's North/South poles (+/−90 latitude).

* * * * *